May 19, 1959 L. D. COBB 2,887,330
DEMOUNTABLE CLOSURE
Filed Jan. 23, 1956

Fig.1-A

INVENTOR:
LELAND D. COBB
by Edward H. Goodrich
HIS ATTORNEY

United States Patent Office 2,887,330
Patented May 19, 1959

2,887,330

DEMOUNTABLE CLOSURE

Leland D. Cobb, Forestville, Conn., assignor to General Motors Corporation, Detroit, Mich., a corporation of Delaware Application January 23, 1956, Serial No. 560,679

5 Claims. (Cl. 286—5)

This invention relates to a demountable closure and particularly to a closure that may be easily snapped into and out of the end of an annular lubricant chamber in an antifriction bearing to retain lubricant within the bearing and to prevent dust, dirt and other deleterious material from entering the bearing.

Heretofore, it has been the practice to permanently close the end of an annular lubricant chamber between a pair of relatively rotatable race rings in an antifriction bearing with a permanently installed seal or shield of sheet metal or the like and which is usually peripherally expanded into tightly wedged sealing engagement with one of the race rings. This tightly wedged relation frequently distorts the race ring in which it is mounted and produces inaccuracies in this precisely ground race ring which results in improper bearing operation and short bearing life. The removal of such a seal or shield for cleaning and relubricating the bearing is usually damaging to the bearing. An infrequent cleaning and relubrication may extend the normal bearing life many times. Hence, a permanently sealed or shielded bearing is usually given no attention and is operated until it fails. A shield extends across the lubricant chamber from its mounted periphery into closely spaced proximity to the other relatively rotatable member or race ring. A seal, which may be peripherally and permanently mounted in the same manner as a shield, usually structurally differs from a shield in that the inner annular portion of the seal is provided with a yieldable annular lip in sealingly wiping engagement with one of the race rings which is rotatable.

It is an object of this invention to provide an improved inexpensive and easily constructed end closure for retaining lubricant within a bearing and for excluding dirt therefrom and which may be repeatedly demounted and replaced in unit-handling assembly with the bearing without damage to the closure or to the bearing.

It is a further object to provide an improved demountable and reversible closure for an annular lubricant chamber between a pair of relatively rotatable members and which closure will serve as a shield or as a seal.

To these ends and also to improve generally upon devices of this character, my invention consists in the various matters hereinafter described and claimed. In its broader aspects, the invention is not necessarily limited to the specific structure selected for illustrative purposes in the accompanying drawings wherein:

Figure 1 is a fragmentary cross sectional view of an antifriction bearing showing my demountable closure installed as a seal.

Figure 1–A is a cross section illustrating my demountable closure before installation.

Figure 1:
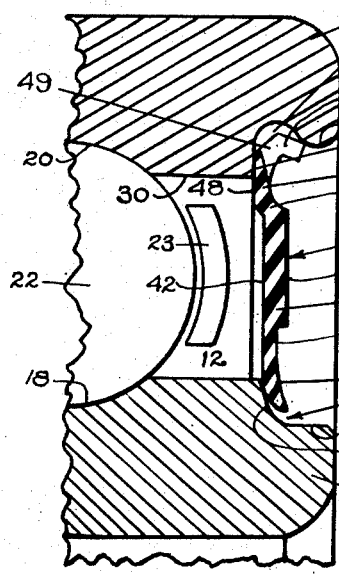
Figure 2:
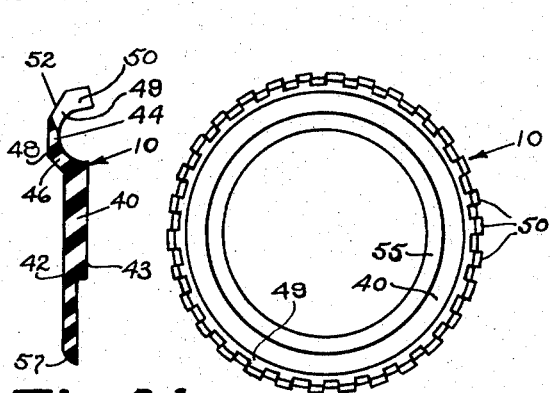
Figure 2 shows a reduced end view of my closure member.
Figure 3:
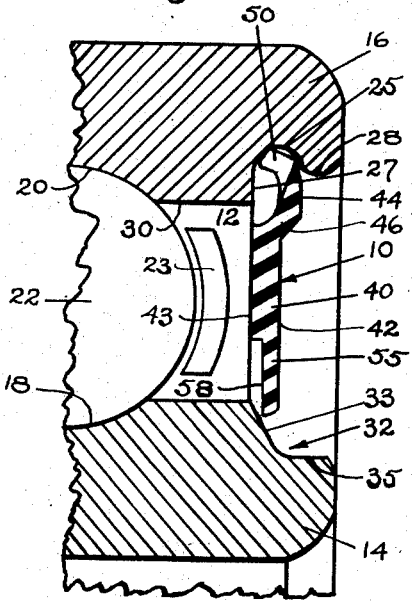
Figure 3 shows my demountable closure installed as a shield in an antifriction bearing.
Figure 4:
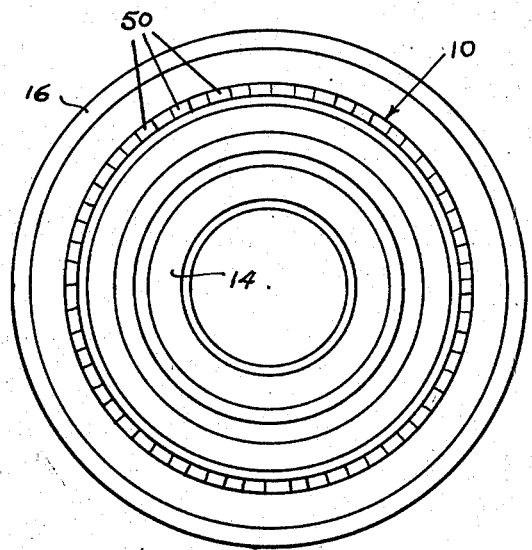
Figure 4 is an end view of an antifriction bearing with the demountable closure installed as a seal.

Generally considered, my demountable closure 10 closes the end of an annular lubricant chamber 12 between a pair of relatively rotatable members herein illustrated as antifriction bearing inner and outer race rings 14 and 16 having opposed raceways 18 and 20 which cooperatively receive rolling elements as circumferentially disposed balls 22 suitably spaced by a separator 23. The demountable closure 10 may be mounted as a seal as shown in Figure 1 or may be mounted in reversed relation to serve as a shield as illustrated in Figure 3.

Either or both ends of one of the race rings as the outer race ring 16 is formed with an annularly extending closure-receiving groove 25 that curves transversely between an annular and generally radially disposed shoulder 27 and a transversely rounded annular land 28 having a diameter which is intermediate that of the bottom of the groove 25 and that of a cylindrical wall 30 extending to the raceway 20. The wall of the groove 25 preferably merges with the shoulder 27 and with the transverse curvature of the land 28. Either or both ends of the other race ring, as the inner race ring 14, is formed with an annularly extending notch 32 having a generally frusto-conical wall 33 and a generally cylindrical wall 35 with an intermediate transversely curved portion preferably merging with the walls 33 and 35.

The reversible and demountable closure member 10 is preferably composed of a material which may be formed in a simple molding operation under influence of heat and pressure. This closure may be composed of various plastic materials which are resiliently yieldable, will not be detrimentally affected by heat, light or bearing lubricants and which have a low coefficient of friction when in wiping contact with a rotated metal surface as the wall of a race ring. A synthetic polymeric amide, commonly referred to as nylon and polymeric tetrafluoroethylene, commonly known as "Teflon" are examples of some of the materials which have been found well suited for my demountable closure.

This closure 10, which is in the form of a somewhat resilient disc, has an annular body portion 40 provided with substantially flat opposed generally radial faces 42 and 43. An annular rim 44 is laterally offset from the body portion 40 and connected thereto by a short intervening frusto-conical wall 46. For purposes of flexibility, this rim is thinner than the body portion. The rim 44 has a flat generally radial wall 48 from which laterally projects an annular flange 49 interrupted by a series of circumferentially spaced resilient projections 50 in the general form of laterally extending fingers or teeth preferably have sharp edges for gripping against the wall of the groove 25. As illustrated in Figure 1–A, these projections 50 are disposed with respect to the flat wall 48 through an angle somewhat greater than 90 degrees so that they will be sprung tightly against the wall of the groove 25. Also, the flange 49 between the wall 48 and these teeth has a frusto-conical portion 52 to prevent bottoming of the flange in the groove 25 when mounted as shown in Figure 1.

The inner portion of the closure 10 has a thinned down lip 55 to provide the required flexible resiliency, this lip having a face coextensive with the face 42 and merging with a rounded portion 57 at its inner edge. The lip also has a flat face 58 in laterally spaced relation to the face 43.

When my closure 10 is to be employed as a seal as shown in Figure 1, the yieldable flange 49 (which has a diameter slightly exceeding that of the land 28) is pressed past the land 28 until the wall 48 seats in sealing engagement against the shoulder 27. The resiliently yieldable teeth will then wedge against the sloping wall of the groove 25 adjacent the land 28, and the yieldable lip 55 will laterally deform into lightly wiping sealing engagement with the frusto-conical wall 33 of the rotatable race ring 14. This lip 55 preferably does not bottom within the notch 32 so that an effective sealing relation will be maintained even in the event of misalignment of the bearing race rings. A suitable tool such as a small screw driver may be entered between the land 28 and the flange 49 to easily pry the seal from the bearing without injury to the bearing or to the closure member 10.

When my closure is to serve as a shield, it is simply snapped past the land 28 in reverse position as shown in Figure 3 in which position the teeth 55 will yieldably wedge in the groove 25. Due to the offset of the face 58 with respect to the face 43, the lip 55 will now be located in closely spaced relation to the notch wall 33. The shield may be easily removed without damage by prying with a suitable tool between the land 28 and the flange 49.

I claim:

1. In combination with a pair of relatively rotatable members having an annular lubricant chamber therebetween, one of said members having an annular seat directed toward the other member, a single piece reversible molded annular closure member, a laterally projecting rim on the closure member demountably engaged against said seat when the closure is mounted with either side towards the lubricant chamber, said rim having an annular series of laterally projecting resilient teeth deformably engageable only at their outer ends with a side wall of said annular seat, and a resilient annular sealing lip on the closure member, said lip locating in sealing engagement with said other member when the closure member is mounted from one side and locating in closely spaced relation to and out of contact with said other member when the closure member is mounted from its other side.

2. The combination with a pair of relatively rotatable members having an annular lubricant chamber therebetween, one of said members having an annular groove opening towards the other member, a single piece reversible annular closure, a laterally projecting rim on the closure demountably seated in the groove and supporting the closure across the lubricant chamber when the closure is mounted from either side towards the lubricant chamber, circumferentially spaced resilient teeth projecting axially from said rim into yieldable endwise abutting engagement with a side wall of said groove and an annular closure lip laterally offset with respect to said rim, said lip locating in seal-wiping contact with said other member when the closure is mounted from one side towards the lubricant chamber and said lip locating in closely spaced relation to and out of contact with said other member when the closure is mounted in reversed position from its other side.

3. The combination with a pair of relatively rotatable members having an annular lubricant chamber therebetween, one of said members having an annular groove opening radially towards the other member, a reversible annular closure having a disc-shaped body portion, a yieldable rim having a radial wall laterally offset from the body portion, an annular toothed portion on said rim axially projecting in a direction opposite to that of the offset of said radial wall, the rim and toothed portion demountably gripping against the walls of said groove when the closure is mounted with either side towards the lubricant chamber, and a radially projecting annular lip extending from the body portion, said lip being laterally offset with respect to said rim and providing a wiping seal against said other member when the closure is mounted from one side and said lip serving as a shield extending into closely spaced but out of contact relation to said other member when the closure is mounted in its reversed position.

4. The combination with a pair of relatively rotatable members having an annular lubricant chamber therebetween, one of said members having an annular groove opening radially towards the other member, said groove merging with an annular shoulder, a reversible annular closure having a disc-shaped body portion, a yieldable resilient rim connected to the body portion, a flat wall on the rim laterally offset from the body portion and engageable with said shoulder, a frusto-conical portion extending from said wall, a circumferential series of laterally projecting toothed portions projecting angularly from said frusto-conical portion and resiliently and deformably seating against a side wall of said groove, and a flexible resilient sealing lip radially extending from the body portion in offset relation to said rim and radially projecting past a portion of said other relatively rotatable member.

5. The combination with a pair of relatively rotatable members having an annular lubricant chamber therebetween, one of said members having an annular groove opening radially towards the other member, said other member having an annular notch opposite the groove, a single piece reversible annular closure having an annular molded body portion, a radially projecting rim secured to the body portion and having a flat annular radial wall in offset parallel relation to and thinner than the body portion, circumferentially spaced fingers laterally projecting from the rim in a direction opposite to that of the offset of said flat annular wall, said fingers being demountably seated in wedged endwise engagement against a side wall of the grove when the closure member is mounted with either side towards the lubricant chamber, a resilient annular lip projecting radially from the body portion in offset relation to said rim, said lip sealingly engaging a wall of said notch when the closure is mounted from one side, and said lip locating in closely spaced but out of contact relation with the wall of the notch when the closure is mounted from its other side in said groove.

References Cited in the file of this patent

UNITED STATES PATENTS

| 2,626,839 | Creson et al. | Jan. 27, 1953 |
| 2,727,764 | Covert et al. | Dec. 20, 1955 |
| 2,755,113 | Baumheckel | July 17, 1956 |

FOREIGN PATENTS

| 978,288 | France | Nov. 22, 1950 |